(12) United States Patent
Samuel et al.

(10) Patent No.: US 11,650,887 B2
(45) Date of Patent: May 16, 2023

(54) SYSTEMS AND METHODS FOR RETRIEVING OPTIMAL FIRMWARE RECOVERY IMAGE IN AN INFORMATION HANDLING SYSTEM

(71) Applicant: Dell Products L.P., Round Rock, TX (US)

(72) Inventors: Balasingh P. Samuel, Round Rock, TX (US); Sungsup Lee, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 24 days.

(21) Appl. No.: 17/010,171

(22) Filed: Sep. 2, 2020

(65) Prior Publication Data

US 2022/0066885 A1 Mar. 3, 2022

(51) Int. Cl.
| | | |
|---|---|---|
| *G06F 11/00* | (2006.01) | |
| *G06F 11/14* | (2006.01) | |
| *G06F 13/20* | (2006.01) | |
| *G06F 9/4401* | (2018.01) | |

(52) U.S. Cl.
CPC ........ *G06F 11/1469* (2013.01); *G06F 9/4403* (2013.01); *G06F 11/1417* (2013.01); *G06F 11/1464* (2013.01); *G06F 13/20* (2013.01); *G06F 2201/84* (2013.01)

(58) Field of Classification Search
CPC .......... G06F 11/1417; G06F 11/1433; G06F 11/1451; G06F 11/1464; G06F 11/1469; G06F 11/2247; G06F 11/2252; G06F 11/2289; G06F 11/3051
See application file for complete search history.

(56) References Cited

U.S. PATENT DOCUMENTS

| | | | | |
|---|---|---|---|---|
| 8,055,892 | B2 * | 11/2011 | Reed | G07F 17/0014 713/1 |
| 8,707,291 | B2 * | 4/2014 | Hale | H04N 21/818 717/172 |
| 10,002,054 | B2 * | 6/2018 | Yang | G06F 9/4401 |
| 10,055,280 | B2 * | 8/2018 | Seibert | G06F 11/0793 |

(Continued)

FOREIGN PATENT DOCUMENTS

WO WO-2013126046 A1 * 8/2013 ............... G06F 8/63

*Primary Examiner* — Marc Duncan
(74) *Attorney, Agent, or Firm* — Jackson Walker L.L.P.

(57) ABSTRACT

A method may include receiving telemetry data from an information handling system communicatively coupled to the information handling system and store the telemetry data based on uniquely identifying information of the information handling system, generating a firmware recovery image for the information handling system based on the telemetry data, storing the recovery image in a recovery image database indexed by the uniquely identifying information, responsive to a condition for initiating firmware recovery of the information handling system, retrieving the firmware recovery image for the information handling system from the recovery image database, and communicating the firmware recovery image to a companion device associated with the information handling system, such that preboot firmware of the information handling system may load and execute the firmware recovery image from the companion device to restore the information handling system.

15 Claims, 3 Drawing Sheets

(56) References Cited

U.S. PATENT DOCUMENTS

| | | | |
|---|---|---|---|
| 10,956,143 B2* | 3/2021 | Shivanna | G06F 8/65 |
| 10,963,333 B1* | 3/2021 | Nijim | G06F 11/3006 |
| 2003/0126242 A1* | 7/2003 | Chang | G06F 9/4416 |
| | | | 709/222 |
| 2007/0239861 A1* | 10/2007 | Reeves | G06F 8/61 |
| | | | 709/222 |
| 2015/0121070 A1* | 4/2015 | Lau | G06F 21/572 |
| | | | 713/189 |
| 2021/0103491 A1* | 4/2021 | Bradley | G06F 11/0793 |

\* cited by examiner

SYSTEMS AND METHODS FOR RETRIEVING OPTIMAL FIRMWARE RECOVERY IMAGE IN AN INFORMATION HANDLING SYSTEM

TECHNICAL FIELD

The present disclosure relates in general to information handling systems, and more particularly to methods and systems for retrieving an optimal firmware recovery image in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In many existing information handling systems a basic input/output system (BIOS) recovery solution may aid a user to recover an information handling system if a boot process fails (e.g., no power on/self test, no video, etc.), if BIOS firmware is corrupted, or if BIOS firmware is compromised. However, existing approaches to BIOS recovery solutions involve complicated processes which often lead to a technical support intervention. Also, existing approaches to BIOS recovery solutions may not effectively work in particular information handling system configurations.

For example, using existing approaches, a recovery image may be static and selected manually by the end user, or in some cases, no selection is available. In such an approach, it is not guaranteed that the recovery image selected by the end user will be effective, and recovering to a previous version of an image may potentially compromise security integrity of an information handling system.

Hard drive-based BIOS recovery may not be possible if a hard drive is encrypted or replaced. Also, hard drive-based BIOS recovery may depend on an underlying chipset technology, which may require continuous maintenance and upgrades, leading to increased cost. In such an approach, recovery efficiency may be reduced when supporting new advanced technologies in the recovery code.

Recovery from an external storage device (e.g., Universal Serial Bus (USB) flash drive) may be complicated and require end users to perform several prerequisite tasks before beginning a recovery process.

Further, existing approaches do not ensure selection of the best possible BIOS recovery image.

SUMMARY

In accordance with the teachings of the present disclosure, the disadvantages and problems associated with BIOS firmware recovery may be reduced or eliminated.

In accordance with embodiments of the present disclosure, an information handling system implementing a cloud recovery server may include a telemetry service configured to receive telemetry data from a second information handling system communicatively coupled to the information handling system and store the telemetry data based on uniquely identifying information of the second information handling system, an analytics engine configured to generate a firmware recovery image for the second information handling system based on the telemetry data and store the recovery image in a recovery image database indexed by the uniquely identifying information, and a firmware recovery image selection agent configured to responsive to a condition for initiating firmware recovery of the second information handling system, retrieve the firmware recovery image for the second information handling system from the recovery image database, and communicate the firmware recovery image to a companion device associated with the second information handling system, such that preboot firmware of the second information handling system may load and execute the firmware recovery image from the companion device to restore the second information handling system.

In accordance with these and other embodiments of the present disclosure, a method may include receiving telemetry data from an information handling system communicatively coupled to the information handling system and store the telemetry data based on uniquely identifying information of the information handling system, generating a firmware recovery image for the information handling system based on the telemetry data, storing the recovery image in a recovery image database indexed by the uniquely identifying information, responsive to a condition for initiating firmware recovery of the information handling system, retrieving the firmware recovery image for the information handling system from the recovery image database, and communicating the firmware recovery image to a companion device associated with the information handling system, such that preboot firmware of the information handling system may load and execute the firmware recovery image from the companion device to restore the information handling system.

In accordance with these and other embodiments of the present disclosure, an article of manufacture may include a processor, a non-transitory computer-readable medium, and computer-executable instructions carried on the computer-readable medium, the instructions readable by the processor, the instructions, when read and executed, for causing the processor to receive telemetry data from an information handling system communicatively coupled to the information handling system and store the telemetry data based on uniquely identifying information of the information handling system, generate a firmware recovery image for the information handling system based on the telemetry data, store the recovery image in a recovery image database indexed by the uniquely identifying information, responsive to a condition for initiating firmware recovery of the information handling system, retrieve the firmware recovery image for the information handling system from the recovery image database, and communicate the firmware recovery image to a companion device associated with the information handling system, such that preboot firmware of the information handling system may load and execute the firmware recovery image from the companion device to restore the information handling system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
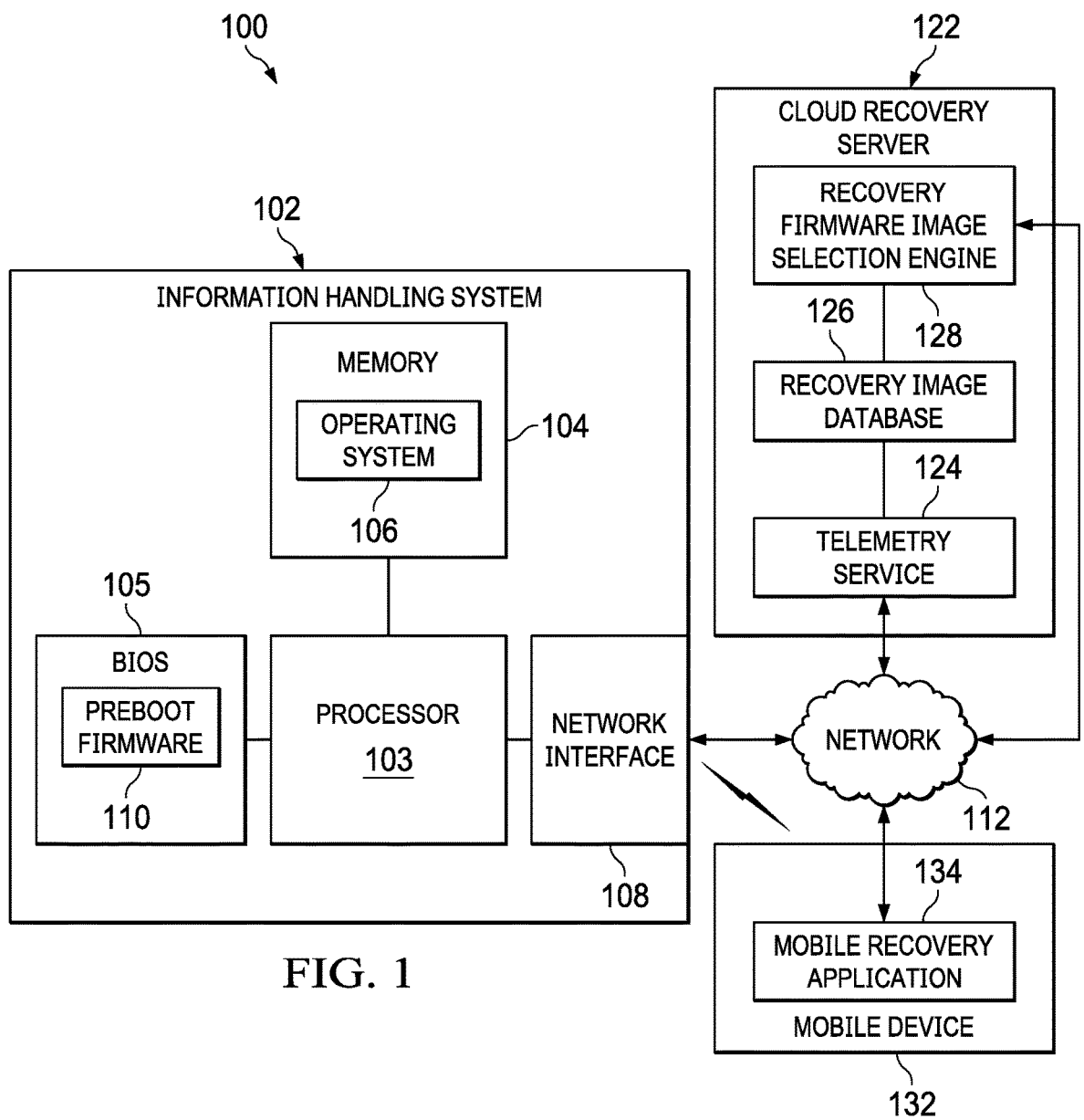
FIG. 1 illustrates a block diagram of an example system for retrieving an optimal firmware recovery image for an information handling system, in accordance with embodiments of the present disclosure.
Figure 2:
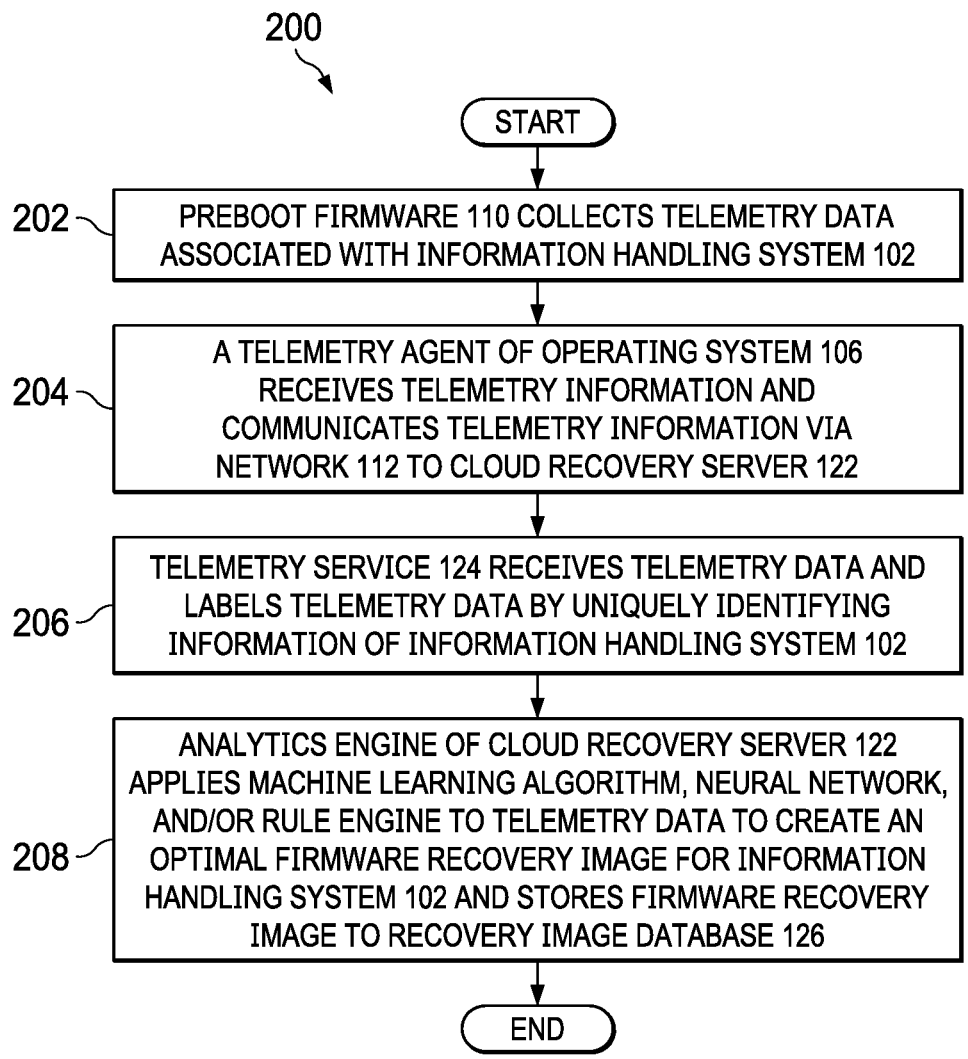
FIG. 2 illustrates a flowchart of an example method for creating an optimal firmware recovery image for an information handling system, in accordance with embodiments of the present disclosure.
Figure 3:
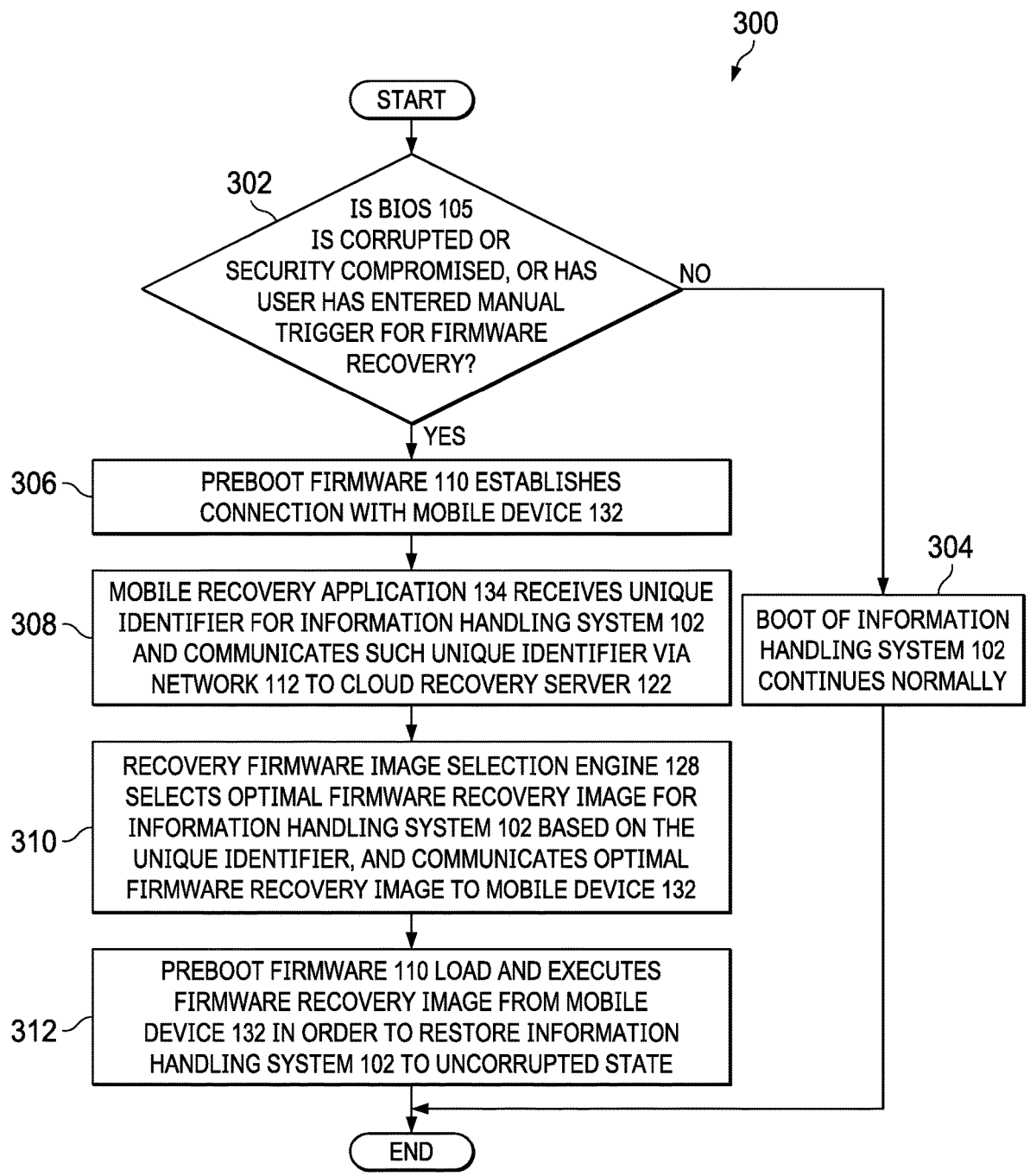
FIG. 3 illustrates a flowchart of an example method for retrieving an optimal firmware recovery image for an information handling system, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

The terms "wireless transmissions" and "wireless communication" may be used to refer to all types of electromagnetic communications which do not require a wire, cable, or other types of conduits. Examples of wireless transmissions which may be used include, but are not limited to, short-range wireless communication technologies (e.g., proximity card, Radio-Frequency Identification (RFID), Near Field Communication (NFC), BLUETOOTH, ISO 14443, ISO 15693, or other suitable standard), IEEE 802.11ad (Wireless Gigabit or "WiGig"), personal area networks (PAN) (e.g., BLUETOOTH), local area networks (LAN), wide area networks (WAN), narrowband personal communications services (PCS), broadband PCS, circuit switched cellular, cellular digital packet data (CDPD), radio frequencies, such as the 800 MHz, 900 MHz, 1.9 GHz and 2.4 GHz bands, infra-red and laser.

The term "wire-line transmissions" may be used to refer to all types of electromagnetic communications over wires, cables, or other types of conduits. Examples of such conduits include, but are not limited to, metal wires and cables made of copper or aluminum, fiber-optic lines, and cables constructed of other metals or composite materials satisfactory for carrying electromagnetic signals. Wire-line transmissions may be conducted in accordance with teachings of the present disclosure over electrical power lines, electrical power distribution systems, building electrical wiring, conventional telephone lines, Ethernet cabling (10baseT, 100baseT, etc.), coaxial cables, T-1 lines, T-3 lines, ISDN lines, ADSL, etc.

FIG. 1 illustrates a block diagram of an example system 100 for retrieving an optimal firmware recovery image for an information handling system 102, in accordance with embodiments of the present disclosure. As shown in FIG. 1, system 100 may include information handling system 102, network 112, cloud recovery server 122, and mobile device 132.

In some embodiments, information handling system 102 may comprise a personal computer. In some embodiments, information handling system 102 may comprise or be an integral part of a server. In other embodiments, information handling system 102 may comprise a portable information handling system (e.g., a laptop or notebook, etc.). As depicted in FIG. 1, information handling system 102 may include a processor 103, a memory 104 communicatively coupled to processor 103, a BIOS 105 communicatively coupled to processor 103, and a network interface 108 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Active portions of operating system 106 may be transferred to memory 104 for execution by processor 103. Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

As shown in FIG. 1, BIOS 105 may implement preboot firmware 110. Preboot firmware 110 may include any system, device, or apparatus configured to execute a preboot execution environment for information handling system 102, and may execute prior to execution of BIOS 105 to initialize information handling system 102 to a defined state prior to execution of BIOS 105. In some embodiments, preboot firmware 110 may be implemented as a program of instructions that may be read by and executed on processor 103 to carry out the functionality of BIOS 105.

Network interface 108 may comprise any suitable system, apparatus, or device operable to serve as an interface between information handling system 102 and one or more other information handling systems via an in-band management network. Network interface 108 may enable information handling system 102 to communicate using any suitable transmission protocol and/or standard. In these and other embodiments, network interface 108 may comprise a network interface card, or "NIC." In some embodiments, network interface 108 may comprise a 10 gigabit Ethernet network interface. In these and other embodiments, network interface 108 may be enabled as a local area network (LAN)-on-motherboard (LOM) card. Network interface 108 may be configured to communicate via wire-line transmissions, wireless transmission, or both.

In addition to processor 103, memory 104, BIOS 105, and network interface 108, information handling system 102 may include one or more other information handling resources.

Network 112 may be a network and/or fabric configured to couple information handling system 102, cloud recovery server 122, and/or one or more other information handling systems to one another. In these and other embodiments, network 112 may include a communication infrastructure, which provides physical connections, and a management layer, which organizes the physical connections and information handling systems communicatively coupled to network 112. Network 112 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 112 may transmit data via wireless transmissions and/or wire-line transmissions using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 112 and its various components may be implemented using hardware, software, or any combination thereof.

Cloud recovery server 122 may comprise any information handling system including requisite hardware, software, and/or firmware for interfacing information handling system 102 via network interface 108 in order to receive telemetry data from information handling system 102, process such telemetry data with a telemetry service 124 to create a recovery image database 126, and execute a firmware recovery image selection engine 128 to select an optimal firmware recovery image for information handling system 102, as described in greater detail below.

Mobile device 132 may comprise a special-purpose information handling system (e.g., a tablet, handheld, smart phone, personal digital assistant, etc.) configured to communicate with network interface 108 via wireless transmissions and execute a mobile recovery application 134 to retrieve and transfer to information handling system 102 an optimal firmware recovery image for information handling system 102, as described in greater detail below.

In addition to information handling system 102, network 112, cloud recovery server 122, and mobile device 132, system 100 may include one or more other information handling resources. For example, although only one information handling system 102 and one mobile device 132 are depicted in FIG. 1 for purposes of clarity and exposition, cloud recovery server 122 may be communicatively coupled via network 112 to multiple information handling systems 102 and be configured to read telemetry data from all of such multiple information handling systems 102 in order to create optimal firmware recovery images for all of such multiple information handling systems 102. Further, cloud recovery server 122 may be communicatively coupled via network 112 to multiple mobile devices 132 and be configured to communicate particular firmware recovery images to such multiple mobile devices 132 in accordance with the present disclosure.

In operation, telemetry service 124 of cloud recovery server 122 may receive telemetry data from a telemetry agent executing within operating system 106 of information handling system 102. Such telemetry data may include uniquely identifying information (e.g., service tag, system identifier, etc.) associated with information handling system 102 and parameters describing one or more hardware and/or software components of information handling system 102. An analytics engine of cloud recovery server 122 may apply a machine learning algorithm, neural network, and/or rule engine to the telemetry data to create an optimal firmware recovery image for information handling system 102, and store the firmware recovery image to recovery image database 126, indexed by uniquely identifying information associated with information handling system 102. Functionality of such analytics engine, and its machine learning algorithm, neural network, and/or rule engine, are outside the scope of this disclosure.

In the event of a corruption of BIOS 105 or other firmware, preboot recovery code within preboot firmware 110 may be configured to establish a connection with mobile device 132 (e.g., via Bluebooth and/or a storage protocol such as Media Transport Protocol). Mobile recovery application 134 may receive a unique identifier for information handling system 102 and communicate such unique identifier via network 112 to cloud recovery server 122. In response, firmware recovery image selection engine 128 may select the optimal firmware recovery image for information handling system 102 based on the unique identifier, and communicate the optimal firmware recovery image to mobile device 132. Once the optimal firmware recovery image has been retrieved by mobile recovery application 134, preboot firmware 110 may store, load, and execute the firmware recovery image in order to restore information handling system 102 to an uncorrupted state.

FIG. 2 illustrates a flowchart of an example method 200 for creating an optimal firmware recovery image for information handling system 102, in accordance with embodiments of the present disclosure. According to certain embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, upon every boot of information handling system 102, preboot firmware 110 collects telemetry data associated with information handling system 102. Such telemetry data may include uniquely identifying information (e.g., service tag, system identifier, etc.) associated with information handling system 102 and parameters describing one or more hardware and/or software components of information handling system 102 (e.g., firmware version, model number, configuration information, thermal information, Serial Peripheral Interface information, etc.). At step 204, a telemetry agent executing in operating system 106 may receive the telemetry information and communicate the telemetry information via network 112 to cloud recovery server 122. Other information handling systems communicatively coupled to cloud recovery server 122 via network 112 may also communicate their telemetry information to cloud recovery server 122.

At step 206, telemetry service 124 may receive such telemetry data and may label such telemetry data by uniquely identifying information of information handling system 102. At step 208, an analytics engine of cloud recovery server 122 may apply a machine learning algorithm, neural network, and/or rule engine to the telemetry data to create an optimal firmware recovery image for information handling system 102, and store the firmware recovery image to recovery image database 126, indexed by uniquely identifying information associated with information handling system 102.

After completion of step 208, method 200 may end.

Although FIG. 2 discloses a particular number of steps to be taken with respect to method 200, it may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102, components thereof or any other system operable to implement method 200. In certain embodiments, method 200 may be implemented partially or fully in software and/or firmware embodied in computer-readable media.

FIG. 3 illustrates a flowchart of an example method 300 for retrieving an optimal firmware recovery image for information handling system 102, in accordance with embodiments of the present disclosure. According to certain embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, during a boot of information handling system 102, preboot firmware 110 may determine if BIOS 105 is corrupted or security compromised, or if a user has entered a manual trigger (e.g., predefined key sequence) for firmware recovery. If BIOS 105 is corrupted or security compromised, or if a user has entered a manual trigger, method 300 may proceed to step 306. Otherwise, method 300 may proceed to step 304.

At step 304, boot of information handling system 102 may continue normally, including execution of method 200 described above. After completion of step 304, method 300 may end.

At step 306, preboot firmware 110 establishes a connection with mobile device 132 (e.g., via Bluebooth and/or a storage protocol such as Media Transport Protocol) in order to allow preboot firmware 110 to communicate with mobile device 132.

At step 308, mobile recovery application 134 may receive a unique identifier for information handling system 102 and communicate such unique identifier via network 112 to cloud recovery server 122. At step 310, in response, firmware recovery image selection engine 128 may select the optimal firmware recovery image for information handling system 102 based on the unique identifier, and communicate the optimal firmware recovery image to mobile device 132.

At step 312, once the optimal firmware recovery image has been retrieved by mobile recovery application 134, preboot firmware 110 may load and execute the firmware recovery image from mobile device 132 in order to restore information handling system 102 to an uncorrupted state. In some embodiments, mobile recovery application 134 may also be configured to display visual guidance (e.g., step-by-step instructions) to the user to aid the user is restoring information handling system 102.

After completion of step 312, method 300 may end.

Although FIG. 3 discloses a particular number of steps to be taken with respect to method 300, it may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 102, components thereof or any other system operable to implement method 300. In certain embodiments, method 300 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system implementing a cloud recovery server, the information handling system comprising:
   a telemetry service configured to receive telemetry data from a second information handling system communicatively coupled to the information handling system and store the telemetry data based on uniquely identifying information of the second information handling system;
   an analytics engine configured to generate a firmware recovery image for the second information handling system based on the telemetry data and store the recovery image in a recovery image database indexed by the uniquely identifying information; and
   a firmware recovery image selection agent configured to:
      responsive to a condition for initiating firmware recovery of the second information handling system, retrieve the firmware recovery image for the second information handling system from the recovery image database; and
      communicate the firmware recovery image to a mobile device with which preboot firmware of the second information handling system has established a wireless connection to transfer the firmware recovery image from the mobile device to the second information handling system in accordance with a media transport protocol.

2. The information handling system of claim 1, wherein the the wireless connection established by the second information handling system with the mobile device comprises a Bluetooth connection.

3. The information handling system of claim 1, wherein the firmware recovery image is a recovery image for a basic input/output system of the second information handling system.

4. The information handling system of claim 1, wherein the condition for initiating firmware recovery of the second information handling system is one of a corruption of firmware of the second information handling system, a security compromise of the second information handling system, and a user action associated with the second information handling system.

5. The information handling system of claim 1, wherein the uniquely identifying information comprises a service tag.

6. A method comprising:
- receiving telemetry data from an information handling system communicatively coupled to the information handling system and store the telemetry data based on uniquely identifying information of the information handling system;
- generating a firmware recovery image for the information handling system based on the telemetry data;
- storing the recovery image in a recovery image database indexed by the uniquely identifying information;
- responsive to a condition for initiating firmware recovery of the information handling system, retrieving the firmware recovery image for the information handling system from the recovery image database; and
- communicating the firmware recovery image to a mobile device with which preboot firmware of the second information handling system has established a wireless connection to transfer, the firmware recovery image from the mobile device to the second information handling system in accordance with a media transport protocol.

7. The method of claim 6, wherein the the wireless connection established by the second information handling system with the mobile device comprises a Bluetooth connection.

8. The method of claim 6, wherein the firmware recovery image is a recovery image for a basic input/output system of the information handling system.

9. The method of claim 6, wherein the condition for initiating firmware recovery of the information handling system is one of a corruption of firmware of the information handling system, a security compromise of the information handling system, and a user action associated with the information handling system.

10. The method of claim 6, wherein the uniquely identifying information comprises a service tag.

11. An article of manufacture comprising:
a processor;
a non-transitory computer-readable medium; and
computer-executable instructions carried on the computer-readable medium, the instructions readable by the processor, the instructions, when read and executed, for causing the processor to:
- receive telemetry data from an information handling system communicatively coupled to the information handling system and store the telemetry data based on uniquely identifying information of the information handling system;
- generate a firmware recovery image for the information handling system based on the telemetry data;
- store the recovery image in a recovery image database indexed by the uniquely identifying information;
- responsive to a condition for initiating firmware recovery of the information handling system, retrieve the firmware recovery image for the information handling system from the recovery image database; and
- communicate the firmware recovery image to a mobile device with which preboot firmware of the second information handling system has established a wireless connection to transfer, the firmware recovery image from the mobile device to the second information handling system in accordance with a media transport protocol.

12. The article of claim 11, wherein the the wireless connection established by the second information handling system with the mobile device comprises a Bluetooth connection.

13. The article of claim 11, wherein the firmware recovery image is a recovery image for a basic input/output system of the information handling system.

14. The article of claim 11, wherein the condition for initiating firmware recovery of the information handling system is one of a corruption of firmware of the information handling system, a security compromise of the information handling system, and a user action associated with the information handling system.

15. The article of manufacture of claim 11, wherein the uniquely identifying information comprises a service tag.

* * * * *

UNITED STATES PATENT AND TRADEMARK OFFICE
CERTIFICATE OF CORRECTION

| | |
|---|---|
| PATENT NO. | : 11,650,887 B2 |
| APPLICATION NO. | : 17/010171 |
| DATED | : May 16, 2023 |
| INVENTOR(S) | : Samuel et al. |

It is certified that error appears in the above-identified patent and that said Letters Patent is hereby corrected as shown below:

In the Claims

1. In Column 11, Line 24, Claim 6, delete "transfer," and insert -- transfer --, therefor.

2. In Column 12, Line 24, Claim 11, delete "transfer," and insert -- transfer --, therefor.

Signed and Sealed this
Twenty-ninth Day of August, 2023

Katherine Kelly Vidal
*Director of the United States Patent and Trademark Office*